(12) United States Patent
Maroli et al.

(10) Patent No.: US 10,915,849 B2
(45) Date of Patent: Feb. 9, 2021

(54) METHOD AND SYSTEM FOR DETERMINING QUALITY LEVEL OF PERFORMANCE DATA ASSOCIATED WITH AN ENTERPRISE

(71) Applicant: Carrier Corporation, Jupiter, FL (US)

(72) Inventors: Vinuraj Maroli, Bangalore (IN); Naga Saravana Babu, Bangalore (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 765 days.

(21) Appl. No.: 15/010,564

(22) Filed: Jan. 29, 2016

(65) Prior Publication Data

US 2017/0169380 A1      Jun. 15, 2017

(30) Foreign Application Priority Data

Dec. 14, 2015   (IN) .......................... 6697/CHE/2015

(51) Int. Cl.
*G06Q 10/06* (2012.01)
*G06Q 50/06* (2012.01)
*G06F 16/901* (2019.01)

(52) U.S. Cl.
CPC ..... *G06Q 10/06395* (2013.01); *G06F 16/901* (2019.01); *G06Q 10/0639* (2013.01); *G06Q 50/06* (2013.01)

(58) Field of Classification Search
CPC ............................................. G06Q 10/06395
See application file for complete search history.

(56) References Cited

U.S. PATENT DOCUMENTS

| 7,599,815 B2 | 10/2009 | Reichel et al. |
| 7,676,523 B2 | 3/2010 | Klein et al. |
| 8,706,537 B1 * | 4/2014 | Young .................... G06Q 10/10 705/7.11 |

(Continued)

OTHER PUBLICATIONS

Richard Y. Wang et al, A Framework for Analysis of Data Quality Research, IEEE Transactions on Knowledge and Data Engineering, vol. I, No. 4, Aug. 1995, pp. 623-640 (Year: 1995).*

(Continued)

*Primary Examiner* — Andre D Boyce
(74) *Attorney, Agent, or Firm* — Cantor Colburn LLP

(57) ABSTRACT

The present disclosure comprises a method for determining quality level of performance data associated with an enterprise comprising one or more domain entities. The method comprises analyzing, by a data quality assessment system, performance data, received from one or more data sources of the enterprise, using one or more quality evaluation parameters associated with the performance data. Thereafter, the data quality assessment system generates one or more events based on the analysis of the performance data. The one or more events are classified by the data quality assessment system, based on predefined event processing guidelines. Further, the data quality assessment system determines a quality index value for each of the one or more domain entities based on the one or more classified events, using the predefined event processing guidelines. Thereafter, the data quality assessment system determines the quality level of the performance data associated with the enterprise.

20 Claims, 4 Drawing Sheets

(56) References Cited

U.S. PATENT DOCUMENTS

| | | | |
|---|---|---|---|
| 2003/0158795 A1* | 8/2003 | Markham | B23Q 35/12 |
| | | | 705/28 |
| 2004/0199368 A1 | 10/2004 | Bechhoefer | |
| 2005/0071185 A1* | 3/2005 | Thompson | G06Q 10/10 |
| | | | 705/317 |
| 2007/0087756 A1* | 4/2007 | Hoffberg | G06Q 10/0631 |
| | | | 455/450 |
| 2011/0307203 A1* | 12/2011 | Higgins | G05B 15/02 |
| | | | 702/84 |
| 2012/0143516 A1 | 6/2012 | Mezic et al. | |
| 2012/0166007 A1 | 6/2012 | Jeong et al. | |
| 2012/0166616 A1* | 6/2012 | Meehan | G06Q 50/06 |
| | | | 709/224 |
| 2013/0138603 A1 | 5/2013 | Chilakamarri et al. | |
| 2014/0188576 A1* | 7/2014 | de Oliveira | G06Q 10/06395 |
| | | | 705/7.39 |
| 2014/0236668 A1* | 8/2014 | Young | G06Q 10/10 |
| | | | 705/7.28 |
| 2014/0337429 A1* | 11/2014 | Asenjo | H04L 65/403 |
| | | | 709/204 |
| 2015/0170076 A1 | 6/2015 | Pawar et al. | |
| 2015/0199629 A1 | 7/2015 | Faile, Jr. et al. | |
| 2015/0339263 A1* | 11/2015 | Abu El Ata | G06F 17/10 |
| | | | 703/2 |

OTHER PUBLICATIONS

Carlo Batini et al, Methodologies for Data Quality Assessment and Improvement, ACM Comput. Surv. 41, 3, Article 16 (Jul. 2009), 52 pages (Year: 2009).*

Richard T. Watson et al, Information Systems and Environmentally Sustainable Development: Energy Informatics and New Directions for the IS Community, MIS Quarterly, Mar. 2010, vol. 34, No. 1 (Mar. 2010), pp. 23-38 (Year: 2010).*

Extended European search report from the European Patent Office for corresponding European Application No. EP 16 15 4128 dated Apr. 25. 2016.

India Office Action for application 6697/CHE/2015, dated Jan. 31, 2020, 6 pages.

* cited by examiner

METHOD AND SYSTEM FOR DETERMINING QUALITY LEVEL OF PERFORMANCE DATA ASSOCIATED WITH AN ENTERPRISE

TECHNICAL FIELD

The present subject matter is related, in general to performance analysis system, and more particularly, but not exclusively to a method and a system for determining quality level of performance data associated with an enterprise comprising one or more domain entities.

BACKGROUND

Generally, performance data gathered from building management systems and sensors available in the building can be used for getting better understanding of energy usage patterns of the building. The performance data gathered is also used for identifying patterns in day to day operations and energy consumption of the building. This leads to the development of energy conservation measures, for improving the energy efficiency of the building. But sensors at buildings are usually not well managed, which provides inaccurate data due to various reasons. Some of the reasons are faulty sensor, calibration and configuration issues and other environmental factors. As an example, the other environmental factors may be radiations from building affecting temperature sensors, interference in measurement due to proximity of appliances used in the building, or the like. Any incorrect decision made due to the lack of quality of data collected, affects the business in multiple ways such as, reduced occupant comfort level, reduced product shelf life, impact on quality of product, or increase in energy spent. In addition to these, unproductive capital expenditure in terms of time and money spent on implementing the energy conservation measure also has a severe impact.

The conventional approaches for determining quality level of the performance data uses quality indicators which are provided by data providers or by comparing sensor data for a given data range. The scope of the conventional approaches are limited to individual sensor level data which does not map with the domain from where the data is collected and hence limited only for the purpose of trend analysis.

Hence, there is a need for creating an understanding of the quality of data gathered from different sources. Also, the capability of identifying the level of quality of gathered data and perform domain level analysis of the obtained data, which helps in various decision making such as filtering out the low quality data and introducing new measures in the data analysis process to absorb the impact of a sub-standard data quality thereby reducing the issues in the data analysis.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein are a method and a system for determining quality level of performance data associated with an enterprise comprising one or more domain entities. A data quality assessment system receives performance data from one or more data sources and analyzes the data to generate one or more events. The one or more events are classified based on their impact on the quality of the performance data and a quality index value is assigned to each of the one or more events to determine the level of quality of the performance data.

Accordingly, the present disclosure comprises a method for determining quality level of performance data associated with an enterprise comprising one or more domain entities. The method comprises analyzing, by a data quality assessment system, the performance data, received from one or more data sources of the enterprise, using one or more quality evaluation parameters associated with the performance data. Thereafter, the data quality assessment system generates one or more events based on the analysis of the performance data. The one or more events impact the quality level of the performance data. Further, the one or more events are classified by the data quality assessment system, based on predefined event processing guidelines. Upon classifying the one or more events, the data quality assessment system determines a quality index value for each of the one or more domain entities based on the one or more classified events, using the predefined event processing guidelines. Thereafter, the data quality assessment system determines the quality level of the performance data associated with the enterprise, based on the quality index value of the one or more domain entities.

Further, the present disclosure comprises a data quality assessment system for determining quality level of performance data associated with an enterprise comprising one or more domain entities. The data quality assessment system comprises a processor and a memory communicatively coupled to the processor. The memory stores the processor-executable instructions, which, on execution, causes the processor to analyze the performance data, received from one or more data sources of the enterprise, using one or more quality evaluation parameters associated with the performance data. Upon analyzing the performance data, the processor generates one or more events based on the analysis of the performance data, wherein the one or more events impact the quality level of the performance data. Further, the processor classifies the one or more events based on predefined event processing guidelines. Upon classifying, the processor determines a quality index value for each of the one or more domain entities based on the one or more classified events, using the predefined event processing guidelines. Finally, the processor determines the quality level of the performance data associated with the enterprise, based on the quality index value of the one or more domain entities.

Further, the present disclosure relates to a non-transitory computer readable medium including instructions stored thereon that when processed by at least one processor causes the data quality assessment system to perform operations comprising analyzing the performance data, received from one or more data sources of the enterprise, using one or more quality evaluation parameters associated with the performance data. The instructions further cause the processor to generate one or more events based on the analysis of the performance data, wherein the one or more events impact the quality level of the performance data. Thereafter, the instructions cause the processor to classify the one or more events based on predefined event processing guidelines. Further, the instructions cause the processor to determine a quality index value for each of the one or more domain entities based on the one or more classified events, using the predefined event processing guidelines. Finally, the instructions cause the processor to determine the quality level of the performance data associated with the enterprise, based on the quality index value of the one or more domain entities.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
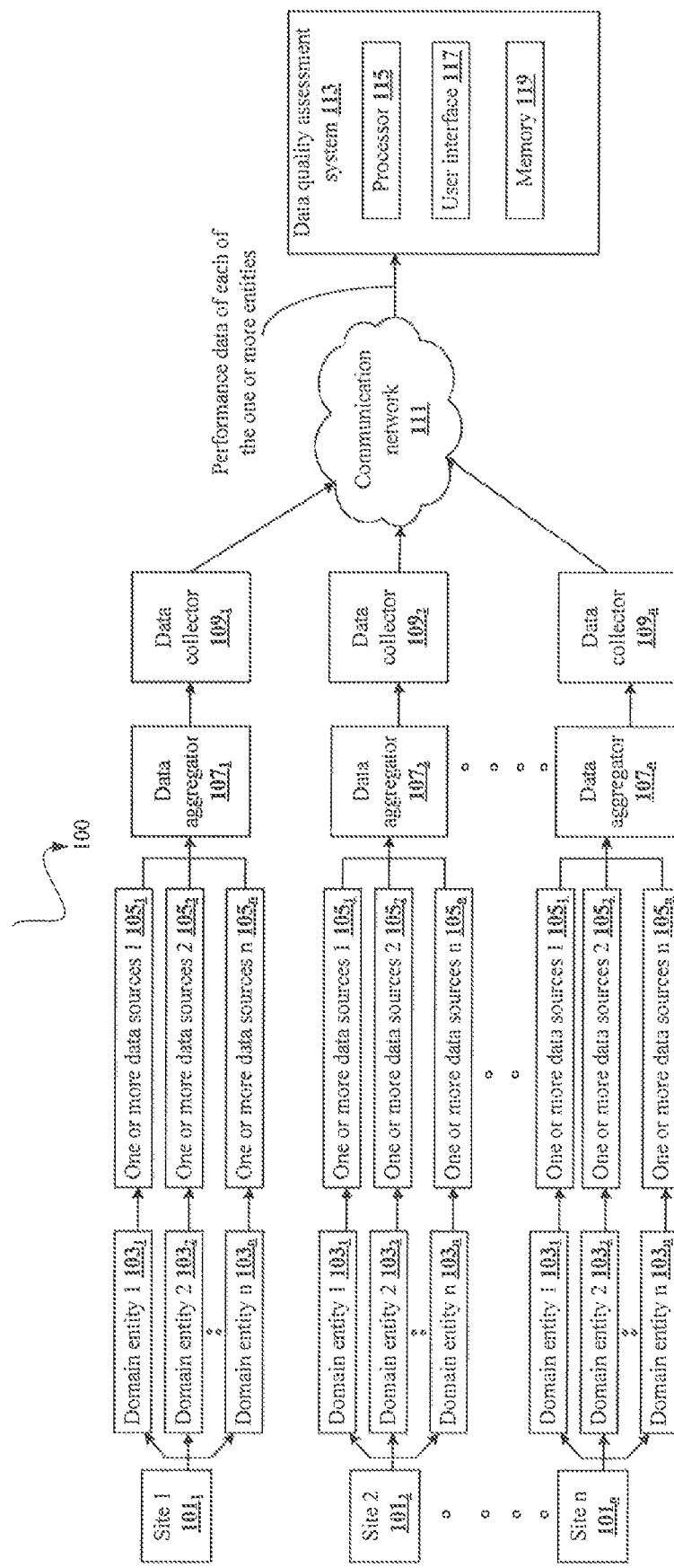
FIG. 1 shows an exemplary architecture for determining quality level of performance data associated with an enterprise comprising one or more domain entities in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure comprises a method and a system for determining quality level of performance data associated with an enterprise comprising one or more domain entities. A Data Quality Assessment System (DQAS) is configured to receive performance data from one or more data sources of the enterprise. A processor configured in the DQAS analyzes the performance data using one or more quality evaluation parameters associated with the performance data. Thereafter, the processor may generate one or more events based on the analysis of the performance data. The one or more events impact the quality level of the performance data. The one or more events are classified by the processor using predefined event processing guidelines. Classification of the one or more events is based on the impact of each of the one or more event on the quality of the performance data. Upon classifying the one or more events, the processor determines a quality index value for each of the one or more domain entities based on the one or more classified events, using the predefined event processing guidelines. A user interface configured in the DQAS enables a user of the DQAS to perform at least one of updating, modification, addition and deletion of the predefined event processing guidelines. Thereafter, the processor determines the quality level of the performance data associated with the enterprise, based on the quality index value of the one or more domain entities.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for determining quality level of performance data associated with an enterprise, comprising one or more domain entities, in accordance with some embodiments of the present disclosure.

The architecture 100 comprises one or more sites, site 1 $101_1$ to site n $101_n$, (collectively referred to as one or more sites 101). The one or more sites 101 may be different branches of an enterprise, located at different geographic locations. Each site would in turn comprise of one or more domain entities, domain entity 1 $103_1$ to domain entity n $103_n$ (collectively referred to as one or more domain entity/entities 103). As an example, the enterprise may refer to a company or an organization. One or more sites may refer to one or more branches of the company and the one or more domain entities may refer to different buildings in each location i.e. each building may be specific to a particular domain in the company. The building may comprise plurality of environment and energy affecting components, as well as one or more data sources, one or more data sources 1 $105_1$ to one or more data sources n $105_n$ (collectively referred to as one or more data sources 105). As an example, the one or more data sources 105 may include but not limited to, sensors like light sensors, occupancy sensors, temperature sensor etc., one or more monitoring and control devices (also referred to as devices), one or more systems like control systems, building management systems etc. Particularly, the building may comprise electric, gas, and heating components, cooling, lighting, water systems and other utilities. Some components such as the cooling coils, fans, chillers and boilers, may be operated to adjust the internal temperature of various rooms of the building. Sensors, such as thermostats and humidistats, may be present and operated locally within the building. Some sensors may transmit their data to and be activated from a central office or a control system. Based on the data received from the one or more data sources 105, the performance of the building may be analyzed for identifying patterns in day to day operations and energy consumption which helps in identifying energy conservation measures.

As an example, the communication network 111 may include at least one of wired communication network and wireless communication network.

The architecture also comprises one or more data aggregators, data aggregator $107_1$ to data aggregator $107_n$ (collectively referred to as data aggregator 107) for aggregating the data received from the one or more data sources. Generally, the control systems and other building management systems in the sites uses different communication protocols for communicating the performance data. The data aggregator 107 may provide a platform to integrate the different buildings in the site 101 by using different communication protocols to connect to a wide range of building management systems and the control systems. The data aggregator 107 may also provide uniform access to all the sites 101 using the standard interface irrespective of the control system and the building management system used in different sites 101.

Further, the architecture comprises one or more data collectors, data collector $109_1$ to data collector $109_n$ (collectively referred to as data collector 109), a communication network 111 and a Data Quality Assessment System (DQAS) 113.

In an embodiment, the data collector 109 may collect the performance data at regular intervals of time, from the one or more data sources 105 configured in the one or more domain entities 103 and provides the data to the DQAS 113 through the communication network 111.

In an embodiment, the performance data transmitted may be at least one of the performance data obtained from each of the one or more sites 101, domain specific performance data obtained upon implementing the data processing verticals on the performance data and correlated performance data obtained upon implementing the data processing batch applications on the performance data. As an example, the data processing verticals comprise data transformation techniques. By implementing the data transformation techniques on the performance data domain specific performance data is obtained. As an example, if data associated with the thermal compliance domain is required, the data transformation technique specific to thermal compliance is implemented on the performance data. Upon implementing the data transformation technique specific to thermal compliance, the data related to thermal compliance is obtained for each of the one or more domain entities 103. As an example, data processing batch applications may be the techniques that consider correlation of the data. Upon implementing the data processing batch applications on the performance data, the domain specific performance data is correlated to have a better understanding of the performance data at domain level.

The DQAS 113 comprises a processor 115, a user interface 117 and a memory 119. The user interface 117 communicatively coupled to the processor 115 may be configured to receive the performance data from the one or more data sources 105. Upon receiving the performance data, the processor 115 analyses the performance data using one or more quality evaluation parameters associated with the performance data. As an example, the one or more quality evaluation parameters may include, but not limited to, checking completeness of the performance data, one or more data quality indicators, one or more performance values received from the one or more data sources 105, time and external factors.

The completeness of the performance data is checked to understand if there are any missing data points present in the performance data. The completeness of the performance data may be checked by using the information present in the previously received samples and predefined event processing guidelines, stored in the memory 119. The predefined event processing guidelines comprises at least one of processing guidelines and processing techniques. The user interface 117 enables a user of the DQAS 113 to perform at least one of updating, modification, addition and deletion, to the predefined event processing guidelines. Performing completeness check is a crucial step as incomplete data leads to wrong analysis results.

In addition, the performance data may be analysed based on one or more data quality indicators to identify the one or more data quality characteristics associated with the one or more data quality indicators. As an example, the data aggregator 107 may provide information on whether the performance data is stale or faulty, depending on status of the data. The staleness and fault in the performance data may act as data quality indicators. Time at which the fault in the performance data is detected and stale weightage assigned to the detected staleness of the performance data, may act as the data quality characteristics.

Further, the performance data may be analysed based on the one or more performance values received from the one or more data sources 105, to identify the one or more data quality characteristics associated with the one or more performance values. The properties of the one or more performance values may act as the data quality characteristics. As an example, the properties associated with the one or more performance values may be, value provided by the sensor i.e. extremely high or low, value remaining unchanged for a long period of time, frequent fluctuations in the value, or the like.

The performance data may be analyzed based on the time and date associated with the performance data, to identify the one or more data quality characteristics. As an example, the values collected at different time intervals by a temperature sensor associated with the building can be compared to check the increase or decrease in the energy efficiency of that building with regard to the temperature. In an embodiment, the value of a temperature sensor at a given point of time may act as one of the data quality characteristic.

The performance data may also be analyzed based on the external factors associated with the performance data, to identify the one or more data quality characteristics. As an example, the external factors may be provided by the control system present in the each building. The external factors may include, but not limited to, the input status of the one or more monitoring and control devices such as the device is up, the device is down, the device not reachable over network etc.

Upon identifying the one or more data quality characteristics of the performance data, the one or more data quality characteristics may be wrapped in the form of an event. i.e. based on the data characteristics one or more events are generated. Each of the one or more events comprises data elements. As an example, the data elements may include, but not limited to, type of data, source affinity, site identifier, asset class code and value. As an example, the type may refer to type of the event such as delayed data event, stale data event etc. The source affinity may refer to affinity of the event type to dimension of the data that is analyzed to generate the event i.e. if the event is generated based on the time stamp associated with the performance data, then time is considered as the source affinity, site identifier indicates identification of the site, the asset class code may refer to the code assigned to each of the building/asset. The one or more events thus generated are further classified by the processor 115 based on the predefined event processing guidelines.

In an embodiment, the classification of the one or more events may be performed by the processor 115 based on the impact of the one or more events on the quality of the performance data. The classification of the one or more events comprises identifying impact factor of each of the one or more events, assigning an impact indicator for each of the one or more events and assigning an impact value to each of the one or more events. The impact factor of each of the one or more events is identified by comparing the one or more events with one or more recorded events. In an embodiment, the one or more recorded events are the events stored in the memory unit 119, which are analyzed in the previous cycles for determining the quality level of the performance data. The quality of the one or more recorded events is also recorded in the memory unit 119. Each of the one or more recorded events is associated with a predefined impact factor. The recorded event which matches with the received event is identified and the predefined impact factor associated with the matched recorded event is detected. Further, an impact indicator is assigned to each of the one or more events. The impact indicator may be at least one of positive impact indicator and negative impact indicator. The positive impact indicator indicates that the one or more events may have a positive impact on the quality of the performance data. The negative impact indicator indicates that the one or more events may have a negative impact on the quality of the performance data. Upon comparing the one or more events with the one or more recorded events, at least one of positive impact indicator and negative impact indicator is assigned to each of the one or more events based on predefined impact indicator of each of the one or more recorded events. Further, an impact value is assigned to each of the one or more events to determine the level of impact of the event on the performance of the data. In an embodiment, impact value corresponds to degree of the impact of each of the one or more events in assessing the quality of the performance data.

Upon classifying the one or more events, the processor 115 may determine a quality index value for each of the one or more domain entities 103, using the predefined event processing guidelines. The quality index value of the one or more domain entities 103 is calculated by first identifying the one or more data quality indicators associated with each of the one or more classified events. The one or more data quality indicators are further normalized for converting the one or more data quality indicators to a standard format. A quality index value for each of the one or more domain entities 103 may be computed by aggregating the one or more data quality indicators belonging to the domain entity 103. Finally the site quality index value is computed by calculating the average of the quality index values of each of the one or more domain entities 103 belonging to the particular site 101. Identifying the one or more data quality indicators corresponding to each of the one or more classified events is based on the predefined event processing guidelines. As an example, the one or more data quality indicators may be stale ratio, out of range ratio, delay factor etc.

The stale ratio is an indication of the percentage of records for which the required values are not updated for a defined period of time. The stale ratio is calculated using the below mentioned formula (1)

$$StaleRatio = \left(\frac{StaleRecordCount}{sampleSize}\right) * staleWeightage \quad (1)$$

In the formula (1), Stale Record Count is the number of stale records identified in a given sample and stale Weightage is the weightage assigned to the quality indicator based on the historical analysis of the data.

Out Of Range ratio (OOR Ratio) is an indication of the percentage records that doesn't fall in the normal range of values allowed for a given type of data point. The OOR ratio is calculated using the below mentioned formula (2):

$$OORRatio = \left(\frac{OutOfRangeRecordCount}{sampleSize}\right) * OORWeightage \quad (2)$$

In the above formula (2), Out Of Range Record Count is the number of data points that are not falling into the normal value range applicable for data point and OOR Weightage is the weightage assigned to the quality indicator based on the historical analysis of the data.

Delay Factor is a normalized indication of the time delay in receiving the performance data. Delay Factor is calculated using the below mentioned formula (3):

$$DelayFactor = \left(\frac{acceptableDelay - averageDelay}{averageDelay}\right) * delayWeightage \quad (3)$$

In the above formula (3), acceptable time delay is the time delay acceptable for the performance data to reach the data collector 109 and the average time delay is average time delay in receiving the data at data collector 109 observed for the sample.

Upon identifying the one or more data quality indicators, each of the identified one or more data quality indicators are normalized. Normalization comprises conversion of each of the identified one or more data quality indicators to a standard format. Normalization of one or more data quality indicators is performed using the below formula (4):

$$yi = \frac{xi - \min(x)}{\max(x) - \min(x)} \quad (4)$$

In the above formula (4), $x=(x_1, x_2, x_3 \ldots x_n)$ and $y_i$ is the $i^{th}$ normalized value.

Upon normalizing the one or more data quality indicators, a quality index value is determined for each of the one or more domain entities 103. The quality index value for each of the one or more domain entities 103 is calculated using the below formula (5):

$$I = \sum_{i=1}^{n} Qi \quad (5)$$

In the above formula (5), I is the quality index value for a given domain entity, $Q_i$ is $i^{th}$ data quality indicator from a list of n available data quality indicators for the given domain entity. The range of the quality index value may be 0 to 1.

Upon determining the quality index value for each of the one or more domain entities 103, a site quality index value for each of the one or more sites 101 is calculated. The site quality index value of each of the one or more sites 101 is calculated using the below formula (6):

$$S = \tilde{Y} \quad (6)$$

In the above formula (6), $Y=(y_1, y_2, y_3, \ldots, y_n)$ is the site quality index value for a given site of the enterprise. The range of the site quality index value may be 0 to 1.

Further, the quality level of the performance data may be determined based on the site quality index value of each of the one or more sites 101. The one or more sites 101 with the site quality index value closer to 1 may represent high quality level of the performance data. The one or more sites 101 with the site quality index value closer to 0 may represent low quality level of the performance data. In an embodiment, a user can define a threshold value for deciding the level of the quality. The quality index values less than the threshold value can be considered as low quality level and the quality index values greater than the threshold value can be considered as high quality level. As an example, consider the threshold value is defined as 0.5. If the quality index value is 0.4, it is considered as low quality level since 0.4 is less than 0.5 and closer to 0. Similarly, if the quality index value is 0.7, it is considered as high quality level since 0.7 is greater than 0.5 and closer to 1. The site quality index value of each of the one or more sites 101 is provided to external applications, to take appropriate measures to improve the quality of the performance data.

Figure 2:
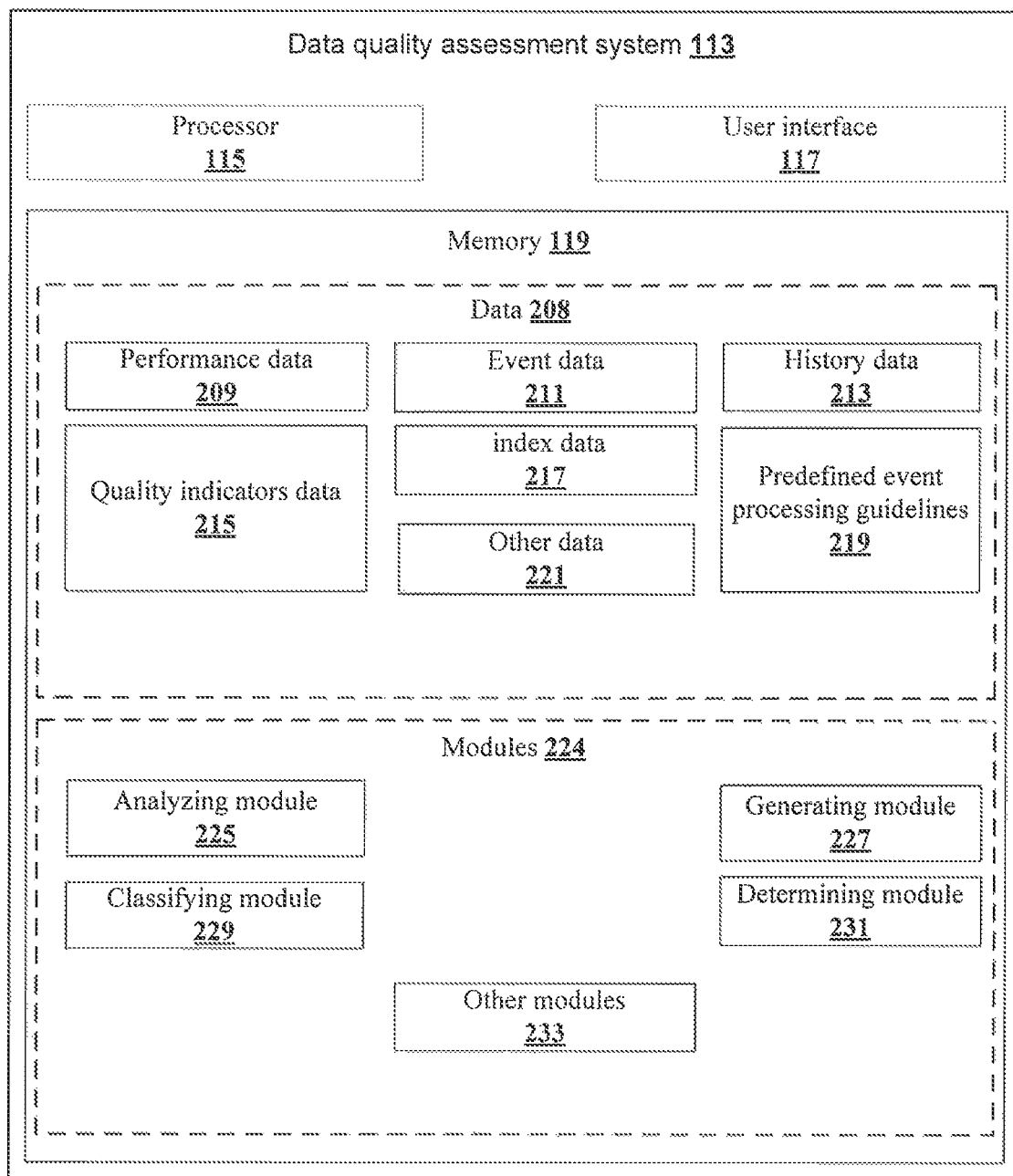
FIG. 2 shows a detailed block diagram of a data quality assessment system for determining quality level of the performance data associated with an enterprise in accordance with some embodiments of the present disclosure.

FIG. 2 shows a detailed block diagram of a data quality assessment system for determining quality level of the performance data associated with an enterprise in accordance with some embodiments of the present disclosure.

In one implementation, the Data Quality Assessment System (DQAS) 113 receives data 208 from one or more data sources 105. As an example, the data 208 is stored in a memory 119. In an embodiment, the data 208 includes performance data 209, event data 211, history data 213, data quality indicators data 215, index data 217, predefined event processing guidelines 219 and other data 221. As an example, the one or more data sources may include but not limited to, sensors like light sensors, occupancy sensors, temperature sensor etc., one or more monitoring and control devices (also referred to as devices), one or more systems like control systems, building management systems etc. In the illustrated FIG. 2, one or more modules 224 stored in the memory 119 are described here in detail.

In one embodiment, the data 208 may be stored in the memory 119 in the form of various data structures. Additionally, the aforementioned data 208 can be organized using data models, such as relational or hierarchical data models. The other data 221 may store data, including temporary data and temporary files, generated by modules 224 for performing the various functions of the DQAS 113.

In an embodiment, the performance data 209 may comprise information related to performance of the corresponding one or more data sources 105 configured in each building over a period of time, which in turn provides the performance of each building over a period of time. A data collector 109 associated with the one or more data sources 105, may collect the performance data 209 at regular intervals of time, from the one or more data sources 105. The performance data 209 may be at least one of the performance data 209 obtained from each of the one or more domain entities 101, domain specific performance data obtained upon implementing the data processing verticals on the performance data 209 and correlated performance data 209 obtained upon implementing the data processing batch applications on the performance data 209.

In an embodiment, event data 211 comprises information of one or more events that are generated based on the analysis of the performance data 209. Each of the one or more events comprises data elements. As an example, the data elements may include, but not limited to, type of data, source affinity, site identifier, asset class code and value. As an example, the type may refer to type of the event such as delayed data event, stale data event etc., the source affinity may refer to affinity of the event type to dimension of the data that is analysed to generate the event i.e. if the event is generated based on the time stamp associated with the performance data 209, then time is considered as the source affinity, site identifier indicates identification of the site, the asset class code may refer to the code assigned to each of the building/asset.

In an embodiment, history data 213 comprises one or more recorded events and predefined impact factor associated with the one or more recorded events. In an embodiment, the one or more recorded events are the events, which were analysed in the previous cycles for determining the quality level of the performance data 209. The quality of the one or more recorded events is known and each of the one or more recorded events is associated with a predefined impact factor. The one or more events are compared with the one or more recorded events to identify the impact factor of the one or more events, based on the predefined impact factor. Upon identifying the impact factor of the one or more events, a corresponding impact value and impact indicator is assigned to each of the one or more events. The impact indicator may be at least one of positive impact indicator and negative impact indicator. The positive impact indicator indicates that the one or more events may have a positive impact on the quality of the performance data 209. The negative impact indicator indicates that the one or more events may have a negative impact on the quality of the performance data 209. The impact value corresponds to degree of the impact of each of the one or more events in assessing the quality of the performance data 209.

In an embodiment, data quality indicators data 215 comprises information of the one or more data quality indicators of the performance data 209. The one or more data quality indicators are the factors that reflect quality of the performance data 209. The performance data 209 is analysed based on one or more data quality indicators to identify data quality characteristics associated with the one or more data quality indicators. As an example, a data aggregator 107 associated with the DQAS 107 may provide information on the performance data 209 whether it is stale or faulty, depending on the status of the data. Staleness and fault in the performance data 209 act as data quality indicators.

In an embodiment, index data 217 comprises the quality index value of the one or more domain entities 103 and the site quality index value. The quality index value is determined for each of the one or more domain entities 103 by aggregating one or more data quality indicators corresponding to each domain entity 103. As an example, the one or more data quality indicators maybe stale ratio, out of range ratio, delay factor etc. The obtained quality index value of the one or more domain entities 103 present in each site 103 are aggregated to determine a site quality index value for each of the one or more sites 101.

In an embodiment, predefined event processing guidelines 219 comprises at least one of processing guidelines and processing techniques for processing, classification of the one or more events, index value creation etc. A user interface 117 configured in the DQAS 113 enables the user of the DQAS 113 to perform at least one of updating, modification, addition and deletion, to the predefined event processing guidelines 219.

In an embodiment, the data stored in the memory 119 is processed by the modules 224 of the DQAS 113. The modules 224 may be stored within the memory 119 as shown in the FIG. 2. In an example, the modules 224, communicatively coupled to the processor 115, may also be outside the memory 119.

In an embodiment, the modules 224 may include, for example, an analyzing module 225, a generating module 227, a classifying module 229, an identifying module 231, a determining module 233 and other modules 241. The other modules 241 may be used to perform various miscellaneous functionalities of the DQAS 113. It will be appreciated that such aforementioned modules 224 may be represented as a single module or a combination of different modules.

In an embodiment, the analyzing module 225 analyses the performance data 209 using one or more quality evaluation parameters associated with the performance data 209, to identify one or more data quality characteristics. As an example, the one or more quality evaluation parameters may include, but not limited to, checking completeness of the performance data 209, one or more data quality indicators, one or more performance values received from the one or more data sources 105, time and external factors. The completeness of the performance data 209 is checked to understand if there are any missing data points present in the performance data 209. In addition, the performance data 209 may be analyzed based on one or more data quality indicators to identify the one or more data quality characteristics associated with the one or more data quality indicators. Further the he performance data 209 may be analyzed based on the one or more performance values received from the one or more data sources 105, to identify the one or more data quality characteristics associated with the one or more performance values. Properties of the one or more performance values may act as the data quality characteristics. The performance data 209 may be analyzed based on the time and date associated with the performance data 209, to identify the one or more data quality characteristics. The performance data 209 may also be analyzed based on the external factors associated with the performance data 209, to identify the one or more data quality characteristics.

In an embodiment, the generating module 227 may generate the one or more events by wrapping the data quality characteristics. Each of the one or more events comprises data elements. As an example, the data elements may include, but not limited to, type, source affinity, site identifier, asset class code and value. The one or more events thus generated are further classified by the processor 115 based on the predefined event processing guidelines 219.

In an embodiment, the classifying module 229 classifies the one or more events based on the impact the one or more events have on the quality of the performance data 209. The classification of the one or more events comprises identifying impact factor of each of the one or more events, assigning an impact indicator for each of the one or more events and assigning an impact value to each of the one or more events. The impact factor of each of the one or more events may be identified by comparing the one or more events with one or more recorded events stored in the memory unit 119, which are analyzed in the previous cycles for determining the quality level of the performance data 209. An impact indicator is assigned to each of the one or more events. The impact indicator may be at least one of positive impact indicator and negative impact indicator. The positive impact indicator indicates that the one or more events may have a positive impact on the quality of the performance data 209. The negative impact indicator indicates that the one or more events may have a negative impact on the quality of the performance data 209. An impact value is assigned to each of the one or more events to determine the level of impact of the event on the performance of the data. In an embodiment, impact value corresponds to degree of the impact of each of the one or more events in assessing the quality of the performance data 209.

In an embodiment, the determining module 231 determines the quality index value for each of the one or more domain entities 103 based on the one or more classified events. The quality index value for each of the one or more domain entities 103 is calculated by first identifying the one or more data quality indicators associated with each of the one or more classified events. The one or more data quality indicators are further normalized for converting the one or more data quality indicators to a standard format. A quality index value for each of the one or more domain entities 103 is computed by aggregating the one or more data quality indicators belonging to the domain entity 103. Finally, the site quality index value is computed by calculating the average of the quality index values of each of the one or more domain entities 103 belonging to the particular site 101. Also, the determining module 231 determines the quality level of the performance data 209 associated with the enterprise based on the site quality index values.

Figure 3:
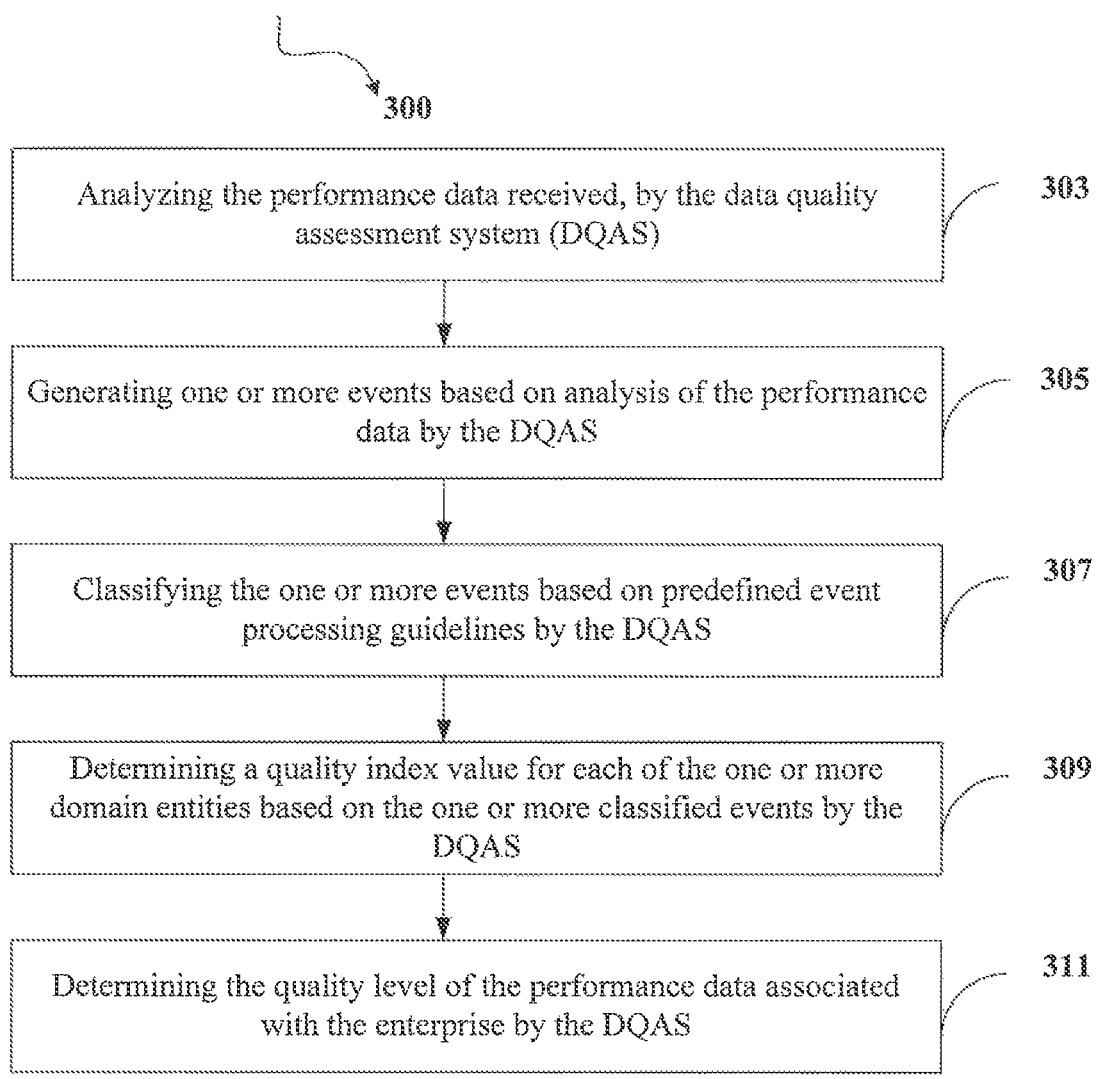
FIG. 3 illustrates a flowchart showing a data quality assessment system for determining quality level of the performance data associated with an enterprise in accordance with some embodiments of the present disclosure.

FIG. 3 illustrates a flowchart showing a data quality assessment system for determining quality level of performance data associated with an enterprise in accordance with some embodiments of the present disclosure.

As illustrated in FIG. 3, the method 300 comprises one or more blocks illustrating a method for determining quality level of the performance data 209 associated with an enterprise. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 303, performance data 209 received from the one or more data sources 105 is analyzed by the Data Quality Analysis System (DQAS) 113. In an embodiment, processor 115 configured in the DQAS 113 analyses the performance data 209 obtained from the one or more data sources 105. The processor 115 may use one or more quality evaluation parameters associated with the performance data 209, to identify one or more data quality characteristics. As an example, the one or more quality evaluation parameters may include, but not limited to, completeness of the performance data 209, one or more data quality indicators, one or more performance values received from the one or more data sources 105, time and external factors. The completeness of the performance data 209 is checked to understand if there are any missing data points present in the performance data 209. The performance data 209 may be analyzed based on the one or more data quality indicators to identify the one or more data quality characteristics associated with the one or more data quality indicators. The performance data 209 may be analyzed based on the one or more performance values received from the one or more data sources 105, to identify the one or more data quality characteristics associated with the one or more performance values. The properties of the one or more performance values may act as the data quality characteristics. As an example, the properties associated with the one or more performance values may be, value provided by the sensor is extremely high or low, value remains unchanged for a long period of time, frequent fluctuations in the value etc.

The performance data 209 may be analyzed based on the time and date associated with the performance data 209, to identify the one or more data quality characteristics. As an example, the values collected at different time intervals by a temperature sensor associated with the building, can be compared to check the increase or decrease in the energy efficiency of that building with regard to the temperature. In an embodiment, the value of a temperature sensor at a given point of time may act as one of the data quality characteristic. Performance data 209 is analyzed based on the external factors associated with the performance data 209, to identify the one or more data quality characteristics. As an example, the external factors may be provided by a control system, comprising, input status of some devices such as device is up, device down, device not reachable over network etc.

At block 305, one or more events are generated based on analysis of the performance data 209 by the DQAS 113. In an embodiment, the processor 115 generates the one or more events based on the data quality characteristics obtained from the analysis of the performance data 209. Upon identifying the one or more data quality characteristics, the data quality characteristics are wrapped in the form of an event. Each of the one or more events comprises data elements. As an example, the data elements may include, but not limited to, type, source affinity, site identifier, asset class code and value. As an example, the type may refer to type of the event such as delayed data event, stale data event etc., the source affinity may refer affinity of the event type to dimension of the data that is analyzed to generate that event i.e. if the event is generated based on the time stamp associated with the performance data 209, then time is considered as the source affinity, site identifier indicates identification of the site, the asset class code may refer to the code assigned to each of the building/asset. The one or more events thus generated are further classified by the processor 115 based on predefined event processing guidelines 219. The predefined event processing guidelines 219 comprises at least one of processing guidelines and processing techniques. A user interface 117 configured in the DQAS 113 enables a user of the DQAS 113 to perform at least one of updating, modification, addition and deletion, to the predefined event processing guidelines 219.

At block 307, classification of the one or more events is performed by the DQAS 113 based on the predefined event processing guidelines 219. In an embodiment, the processor 115 may classify the one or more events in accordance with impact each of the one or more events have on the quality of the performance data 209. The one or more events are classified by first identifying impact factor of each of the one or more events. The impact factor of each of the one or more events is identified by comparing the one or more events with one or more recorded events. Further, an impact indicator is assigned for each of the one or more events. The impact indicator may be at least one of positive impact indicator and negative impact indicator. The positive impact indicator indicates that the one or more events may have a positive impact on the quality of the performance data 209. The negative impact indicator indicates that the one or more events may have a negative impact on the quality of the performance data 209. Further, an impact value is assigned to each of the one or more events to determine the level of impact of the event on the performance of the data. In an embodiment, impact value corresponds to degree of the impact of each of the one or more events in assessing the quality of the performance data 209.

At block 309, the quality index value for each of the one or more domain entities 103 is determined based on the one or more classified events. In an embodiment, the processor 115 may determine quality index value for each of the one or more domain entities 103, using the predefined event processing guidelines 219. The quality index value of the one or more domain entities 103 is calculated by first identifying the one or more data quality indicators associated with each of the one or more classified events. The one or more data quality indicators are further normalized for converting the one or more data quality indicators to a standard format. A quality index value for each of the one or more domain entities 103 may be computed by aggregating the one or more data quality indicators belonging to the domain entity 103.

At block 311, the quality level of the performance data 209 associated with the enterprise is determined by the DQAS 107. In an embodiment, the processor 115 may determine the site quality index value by calculating the average of the quality index values of each of the one or more domain entities 103 belonging to the particular site 101. Also, the determining module 231 may determine the quality level of the performance data 209 associated with the enterprise based on the site quality index values. The one or more sites 101 with the quality index value closer to 1 may represent high quality level of the performance data 209. The one or more sites 101 with the quality index value closer to 0 may represent low quality level of the performance data 209. The quality index value of each of the one or more sites 101 is provided to external applications, to take appropriate measures to improve the quality of the data.

Figure 4:
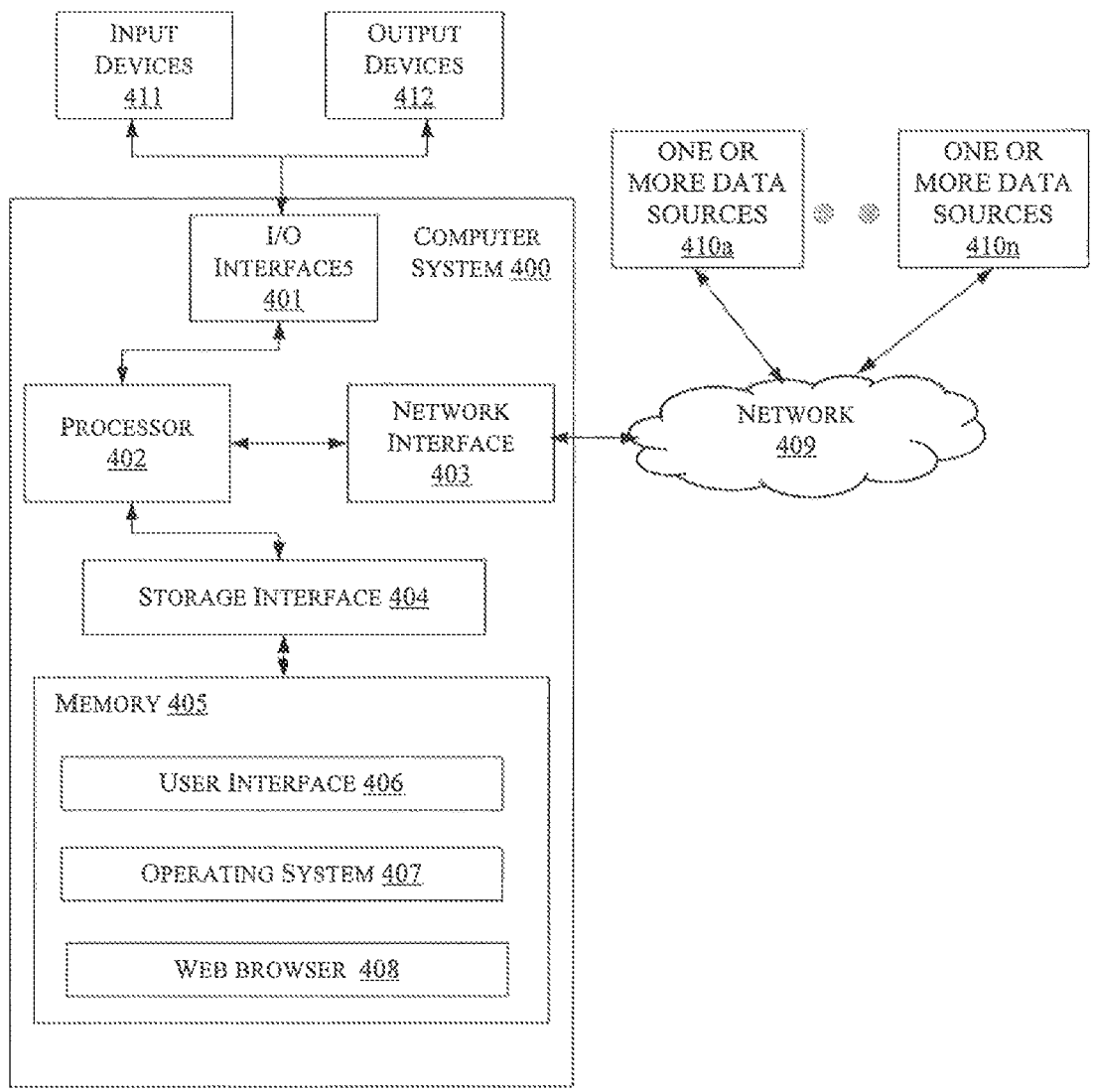
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the computer system 400 is used for determining quality level of performance data associated with an enterprise comprising one or more domain entities. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more data sources 410 (*a*, . . . ,*n*). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more data sources 410 (*a*, . . . ,*n*) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read- Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method for determining quality level of performance data associated with an enterprise comprising one or more domain entities.

The present disclosure provides a feature wherein a level of quality of performance data, gathered from one or more data sources configured in the buildings are mapped to one or more domain entities. As a result, quality of the data is evaluated at the domain entity level and analysis is performed at domain level. Having an understanding of the quality level of the data used for analysis at the domain entity level is more useful and less complex when compared to the quality information available at individual sensor level.

In the present invention the data quality characteristics are used to build quality index value which indicates the quality of the performance data. The quality index value helps in developing a confidence level on the performance data used for analysis for various decision making in energy conservation.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for determining quality level of performance data associated with an enterprise comprising one or more domain entities. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral Numerals: | |
|---|---|
| Reference Number | Description |
| 100 | Architecture |
| $101_1, 101_2, 101_3, \ldots 101_n$ | One or more sites |
| $103_1, 103_2, 103_3, \ldots 103_n$ | One or more domain entities |
| $105_1, 105_2, 105_3, \ldots 105_n$ | One or more data sources |
| $107_1, 107_2, 107_3, \ldots 107_n$ | Data aggregator |
| $109_1, 109_2, 109_3, \ldots 109_n$ | Data collector |
| 111 | Communication network |
| 113 | Data quality assessment system |
| 115 | Processor |
| 117 | User interface |
| 119 | Memory |
| 208 | Data |
| 209 | Performance data |
| 211 | Event data |
| 213 | History data |
| 215 | Data quality indicators data |
| 217 | Index data |
| 219 | Predefined event processing guidelines |
| 221 | Other data |
| 224 | Modules |
| 225 | Analysing module |
| 227 | Generating module |
| 229 | Classifying module |
| 231 | Determining module |
| 233 | Other modules |

What is claimed is:

1. A method for determining quality level of performance data associated with an enterprise comprising one or more domain entities, the method comprising:
    receiving, by a data quality assessment system comprising one or more processors, performance data from one or more data sources of the enterprise system via a communication network, wherein the one or more data sources includes at least an occupancy sensor that transmits the performance data over the communication network;
    analyzing, by the data quality assessment system, the performance data using one or more quality evaluation parameters associated with the performance data;
    generating, by the data quality assessment system, one or more events based on the analysis of the performance data, wherein the one or more events impact the quality level of the performance data;
    classifying, by the data quality assessment system, the one or more events based on predefined event processing guidelines;
    determining, by the data quality assessment system, a quality index value for each of the one or more domain entities based on the one or more classified events, using the predefined event processing guidelines; and determining, by the data quality assessment system, the quality level of the performance data associated with the enterprise, based on the quality index value of the one or more domain entities;

wherein determining the quality index value for each of the one or more domain entities includes identifying, by the data quality assessment system, a plurality of data quality indicators corresponding to each of the one or more classified events based on the predefined event processing guidelines, wherein the plurality of data quality indicators includes a delay factor, an out of range ratio and a stale ratio, wherein the stale ratio is calculated by the data quality assessment system by dividing a stale record count by a sample size and multiplying the result of the division by an assigned stale weightage, wherein the stale record count is a number of stale records identified in a given sample, wherein the stale weightage is assigned based on historical analysis of the performance data.

2. The method as claimed in claim 1, wherein classifying the one or more events comprises:

identifying, by the data quality assessment system, impact factor of each of the one or more events in determining the quality level of the performance data, by comparing the one or more events with one or more recorded events;

assigning, by the data quality assessment system, an impact indicator for each of the one or more events based on the impact factor, wherein the impact indicator is one of positive impact and negative impact; and classifying, by the data quality assessment system, each of the one or more events based on the impact indicator for each of the one or more events.

3. The method as claimed in claim 2, wherein each of the one or more recorded events is associated with a predefined impact factor based on historical data.

4. The method as claimed in claim 1, wherein determining the quality index value for each of the one or more domain entities further comprises:

aggregating, by the data quality assessment system, the plurality of data quality indicators to determine the quality index value for each of the one or more domain entities in the enterprise.

5. The method as claimed in claim 4, further comprises:

computing, by the data quality assessment system, average of each of the quality index values to determine a site quality index value, wherein the site quality index value specifies the quality index value associated with a site, in the enterprise, comprising the one or more domain entities.

6. The method as claimed in claim 4, wherein the plurality of data quality indicators are normalized by converting each data quality indicator of the plurality of data quality indicators to a standard format.

7. The method as claimed in claim 1, wherein the quality index value ranges from 0 to 1.

8. A data quality assessment system for determining quality level of performance data associated with an enterprise comprising one or more domain entities, the data quality assessment system comprising:

a processor; and a memory communicatively coupled to the processor, wherein the memory stores the processor-executable instructions, which, on execution, causes the processor to:

receive performance data via a communication network from one or more data sources of the enterprise, wherein the one or more data sources includes at least an occupancy sensor that transmits the performance data over the communication network;

analyze the performance data using one or more quality evaluation parameters associated with the performance data;

generate one or more events based on the analysis of the performance data, wherein the one or more events impact the quality level of the performance data;

classify the one or more events based on predefined event processing guidelines;

determine a quality index value for each of the one or more domain entities based on the one or more classified events, using the predefined event processing guidelines; and determine the quality level of the performance data associated with the enterprise, based on the quality index value of the one or more domain entities;

wherein the quality index value is determined for each of the one or more domain entities based on at least identifying, by the processor, a plurality of data quality indicators corresponding to each of the one or more classified events based on the predefined event processing guidelines, wherein the plurality of data quality indicators includes a delay factor, an out of range ratio and a stale ratio, wherein the stale ratio is calculated by the processor by dividing a stale record count by a sample size and multiplying the result of the division by an assigned stale weightage, wherein the stale record count is a number of stale records identified in a given sample, wherein the stale weightage is assigned based on historical analysis of the performance data.

9. The data quality assessment system as claimed in claim 8, wherein the processor classifies one or more events by:

identifying impact factor of each of the one or more events in determining the quality level of the performance data, by comparing the one or more events with one or more recorded events;

assigning an impact indicator for each of the one or more events based on the impact factor, wherein the impact indicator is one of positive impact and negative impact; and classifying each of the one or more events based on the impact indicator for each of the one or more events.

10. The data quality assessment system as claimed in claim 9, wherein each of the one or more recorded events is associated with a predefined impact factor based on historical data.

11. The data quality assessment system as claimed in claim 8, wherein the processor determines the quality index value for each of the one or more domain entities further by:

aggregating the plurality of data quality indicators to determine the quality index value for each of the one or more domain entities in the enterprise.

12. The data quality assessment system as claimed in claim 11 further comprises computing average of each of the quality index values to determine a site quality index value, wherein the site quality index value specifies the quality index value associated with a site, in the enterprise, comprising the one or more domain entities.

13. The data quality assessment system as claimed in claim 11, wherein the plurality of data quality indicators are normalized by converting each data quality indicator of the plurality of data quality indicators to a standard format.

14. The data quality assessment system as claimed in claim 8, wherein the quality index value ranges from 0 to 1.

15. A non-transitory computer readable medium storing computer-executable instructions for:
receiving, by a data quality assessment system comprising one or more processors, performance data from one or more data sources of the enterprise system via a communication network, wherein the one or more data sources includes at least an occupancy sensor that transmits the performance data over the communication network;
analyzing, by the data quality assessment system, the performance data using one or more quality evaluation parameters associated with the performance data;
generating, by the quality assessment system, one or more events based on the analysis of the performance data, wherein the one or more events impact the quality level of the performance data;
classifying, by the quality assessment system, the one or more events based on predefined event processing guidelines;
determining, by the quality assessment system, a quality index value for each of the one or more domain entities based on the one or more classified events, using the predefined event processing guidelines; and
determining, by the quality assessment system, the quality level of the performance data associated with the enterprise, based on the quality index of the one or more domain entities;
wherein determining the quality index value for each of the one or more domain entities includes identifying, by the data quality assessment system, one or more data quality indicators corresponding to each of the one or more classified events based on the predefined event processing guidelines, wherein the plurality of data quality indicators includes a delay factor, an out of range ratio and a stale ratio, wherein the stale ratio is calculated by the quality assessment system by dividing a stale record count by a sample size and multiplying the result of the division by an assigned stale weightage, wherein the stale record count is a number of stale records identified in a given sample, wherein the stale weightage is assigned based on historical analysis of the performance data.

16. The non-transitory computer readable medium as claimed in claim 15, wherein the instructions for classifying the one or more events comprises:
identifying, by the data quality assessment system, impact factor of each of the one or more events in determining the quality level of the performance data, by comparing the one or more events with one or more recorded events;
assigning, by the data quality assessment system, an impact indicator for each of the one or more events based on the impact factor, wherein the impact indicator is one of positive impact and negative impact; and
classifying, by the data quality assessment system, each of the one or more events based on the impact indicator for each of the one or more events.

17. The non-transitory computer readable medium as claimed in claim 15, wherein the instructions for determining the quality index value for each of the one or more domain entities further comprises:
aggregating, by the data quality assessment system, the plurality of data quality indicators to determine the quality index value for each data quality indicator of the one or more domain entities in the enterprise.

18. The non-transitory computer readable medium as claimed in claim 17, wherein the instructions further comprises:
computing average of each of the quality index values to determine a site quality index value, wherein the site quality index value specifies the quality index value associated with a site, in the enterprise, comprising the one or more domain entities.

19. The non-transitory computer readable medium as claimed in claim 17, wherein the plurality of data quality indicators are normalized by converting each data quality indicator of the plurality of data quality indicators to a standard format.

20. The non-transitory computer readable medium as claimed in claim 17, wherein the quality index value ranges from 0 to 1.

* * * * *